US012444552B2

(12) United States Patent
Tannhäuser

(10) Patent No.: US 12,444,552 B2
(45) Date of Patent: Oct. 14, 2025

(54) CIRCUIT BREAKER DEVICE AND METHOD

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/696,499

(22) PCT Filed: Sep. 5, 2022

(86) PCT No.: PCT/EP2022/074609
§ 371 (c)(1),
(2) Date: Mar. 28, 2024

(87) PCT Pub. No.: WO2023/052046
PCT Pub. Date: Apr. 6, 2023

(65) Prior Publication Data

US 2024/0395479 A1 Nov. 28, 2024

(30) Foreign Application Priority Data

Sep. 28, 2021 (DE) ..................... 10 2021 210 831.8

(51) Int. Cl.
*H01H 9/54* (2006.01)

(52) U.S. Cl.
CPC .................................. *H01H 9/547* (2013.01)

(58) Field of Classification Search
CPC ........... H01H 9/547; H01H 9/548; H01H 9/54
USPC .......................................................... 307/113
See application file for complete search history.

(56) References Cited

U.S. PATENT DOCUMENTS

| | | | | |
|---|---|---|---|---|
| 11,538,642 | B2 | 12/2022 | Hussmann | |
| 2017/0004948 | A1 | 1/2017 | Leyh | |
| 2020/0366078 | A1* | 11/2020 | Telefus | H02H 3/044 |
| 2021/0066013 | A1 | 3/2021 | Kumar et al. | |
| 2022/0337046 | A1 | 10/2022 | Erven | |

FOREIGN PATENT DOCUMENTS

| | | | |
|---|---|---|---|
| DE | 102018213354 | A1 | 2/2020 |
| DE | 102019213604 | A1 | 3/2021 |

* cited by examiner

*Primary Examiner* — Rexford N Barnie
*Assistant Examiner* — Xuan Ly
(74) *Attorney, Agent, or Firm* — Laurence A. Greenberg; Werner H. Stemer; Ralph E. Locher

(57) ABSTRACT

A circuit breaker protects an electric low-voltage circuit. The circuit breaker contains a housing with a grid-side connection and a load-side connection, and a mechanical separating contact unit which is connected to an electronic interruption unit in series. The mechanical separating contact unit can be switched by opening contacts to prevent a current flow or by closing the contacts for a current flow in the low-voltage circuit. Due to switching elements, the electronic interruption unit can be switched to a high-ohmic state of the switching elements to prevent a current flow or to a low-ohmic state of the switching elements for a current flow in the low-voltage circuit. The level of the current in the low-voltage circuit is ascertained. A process for preventing a current flow in the low-voltage circuit is initiated if current thresholds and/or current/time thresholds are exceeded.

19 Claims, 7 Drawing Sheets

CIRCUIT BREAKER DEVICE AND METHOD

FIELD AND BACKGROUND OF THE INVENTION

The invention relates to the technical field of a circuit breaker device for a low-voltage circuit having an electronic interruption unit and to a method for a circuit breaker device for a low-voltage circuit having an electronic interruption unit.

Low voltage is used to mean voltages of up to 1000 volts AC or up to 1500 volts DC. Low voltage is used to mean, in particular, voltages that are greater than the extra-low voltage, with values of 50 volts AC or 120 volts DC.

A low-voltage circuit or network or system is used to mean circuits having nominal currents or rated currents of up to 125 amperes, more specifically up to 63 amperes. A low-voltage circuit is used to mean, in particular, circuits having nominal currents or rated currents of up to 50 amperes, 40 amperes, 32 amperes, 25 amperes, 16 amperes or 10 amperes. The current values mentioned are used to mean, in particular, nominal, rated or/and switch-off currents, that is to say the current that is normally conducted at most via the circuit, or for which the electrical circuit is usually interrupted, for example by a protection device such as a circuit breaker device, a miniature circuit breaker or a power circuit breaker. The nominal currents can be scaled further from 0.5 A, via 1 A, 2 A, 3 A, 4 A, 5 A, 6 A, 7 A, 8 A, 9 A, 10 A, etc., to 16 A.

Miniature circuit breakers are overcurrent protection devices which have been known for a long time and are used in electrical installation technology in low-voltage circuits. They protect lines from damage caused by heating on account of an excessively high current and/or a short circuit. A miniature circuit breaker can automatically switch off the circuit in the event of an overload and/or a short circuit. A miniature circuit breaker is a fuse element that does not automatically reset.

In contrast to miniature circuit breakers, power circuit breakers are provided for currents of greater than 125 A, sometimes also even above 63 amperes. Miniature circuit breakers therefore have a simpler and more delicate design. Miniature circuit breakers usually have a fastening possibility for fastening on a so-called top-hat rail (mounting rail, DIN rail, TH35).

Miniature circuit breakers have an electromechanical design. In a housing, they have a mechanical switching contact or shunt opening release for interrupting (tripping) the electrical current. A bimetallic protection element or bimetallic element is usually used for tripping (interruption) in the case of a longer-lasting overcurrent (overcurrent protection) or in the event of a thermal overload (overload protection). An electromagnetic release with a coil is used for brief tripping if an overcurrent limit value is exceeded or in the event of a short circuit (short-circuit protection). One or more arc quenching chamber(s) or arc quenching devices are provided. Connection elements for conductors of the electrical circuit to be protected are also provided.

Circuit breaker devices having an electronic interruption unit are relatively new developments. They have a semiconductor-based electronic interruption unit. That is to say, the electrical current flow in the low-voltage circuit is conducted via semiconductor components or semiconductor switches which can interrupt the electrical current flow or can be switched to be conductive. Circuit breaker devices having an electronic interruption unit also often have a mechanical isolating contact system, in particular with isolator properties according to relevant standards for low-voltage circuits, wherein the contacts of the mechanical isolating contact system are connected in series with the electronic interruption unit, that is to say the current of the low-voltage circuit to be protected is conducted both via the mechanical isolating contact system and via the electronic interruption unit.

The present invention relates, in particular, to low-voltage AC circuits having an AC voltage, usually having a time-dependent sinusoidal AC voltage of the frequency f. The temporal dependence of the instantaneous voltage value u(t) of the AC voltage is described by the equation:

$$u(t) = U * \sin(2\pi * f * t),$$

where:

u(t)=instantaneous voltage value at the time t

U=amplitude of the voltage

A harmonic AC voltage can be represented by the rotation of a phasor, the length of which corresponds to the amplitude (U) of the voltage. The instantaneous deflection is the projection of the phasor onto a coordinate system. An oscillation period corresponds to a full revolution of the phasor and its full angle is 2π (2 pi) or 360°. The angular frequency is the rate of change of the phase angle of this rotating phasor. The angular frequency of a harmonic oscillation is always 2π times its frequency, that is to say:

$$\omega = 2\pi * f = 2\pi/T = \text{angular frequency of the AC voltage}$$

(T=period duration of the oscillation)

It is often preferred to give the angular frequency (ω) rather than the frequency (f), since many formulae in oscillation theory can be represented more compactly using the angular frequency due to the occurrence of trigonometric functions, the period of which is by definition 2π:

$$u(t) = U * \sin(\omega t)$$

In the case of angular frequencies that are not constant over time, the term instantaneous angular frequency is also used.

In the case of a sinusoidal AC voltage, in particular an AC voltage that is constant over time, the time-dependent value formed from the angular velocity ω and the time t corresponds to the time-dependent angle φ(t), which is also referred to as the phase angle φ(t). That is to say, the phase angle φ(t) periodically passes through the range 0 . . . 2π or 0° . . . 360°. That is to say, the phase angle periodically assumes a value of between 0 and 2n or 0° and 360° (φ=n*(0 . . . 2π) or φ=n*(0° . . . 360°) on account of periodicity; in abbreviated form: φ=0 . . . 2π or φ=0° . . . 360°).

The instantaneous voltage value u(t) is therefore used to mean the instantaneous value of the voltage at the time t, that is to say, in the case of a sinusoidal (periodic) AC voltage, the value of the voltage at the phase angle φ (φ=0 . . . 2π or φ=0° . . . 360°, of the respective period).

SUMMARY OF THE INVENTION

The object of the present invention is to improve a circuit breaker device of the type mentioned at the outset, in particular to improve the safety of such a circuit breaker device or to achieve a higher degree of safety in the electrical low-voltage circuit to be protected by the circuit breaker device.

This object is achieved by means of a circuit breaker device having the features of the independent circuit breaker device patent claim and by means of a method as claimed in the independent method patent claim.

The invention proposes a circuit breaker device for protecting an electrical low-voltage circuit, in particular a low-voltage AC circuit, having:

- a housing with at least one network-side connection and one load-side connection,
- a mechanical isolating contact unit, which is connected in series with an electronic interruption unit, wherein the mechanical isolating contact unit is assigned to the load-side connection and the electronic interruption unit is assigned to the network-side connection,
- wherein the mechanical isolating contact unit is able to be switched by opening contacts in order to avoid a current flow or closing the contacts for a current flow in the low-voltage circuit,
- wherein the electronic interruption unit is able to be switched, by means of semiconductor-based switching elements, to a high-impedance state of the switching elements in order to avoid a current flow or a low-impedance state of the switching elements for the current flow in the low-voltage circuit,
- a current sensor unit for determining the level of the current of the low-voltage circuit,
- a control unit, which is connected to the current sensor unit, the mechanical isolating contact unit and the electronic interruption unit, wherein avoidance of a current flow in the low-voltage circuit is initiated if current limit values or/and current-time limit values are exceeded.

According to the invention, the circuit breaker device is configured in such a manner that, if the contacts of the mechanical isolating contact unit (MK) are closed and the electronic interruption unit (EU) has been switched to the low-impedance state, the electronic interruption unit (EU) is switched to a high-impedance state for a first period of time for functional testing.

The first period of time may preferably be in the range of 100 μs to 5 ms. The first period of time may be in the range of 100 μs to 20 ms, for example 100 μs, 200 μs, . . . , 1 ms, 2 ms, . . . 5 ms, . . . 20 ms; any intermediate value is possible and disclosed. This has the particular advantage that the electronic interruption unit can be checked with regard to its “ability to be switched off”. This also takes place during ongoing operation, without further restrictions. As a result of the short times, the loads or consumers are advantageously not disconnected from the network for long. Increased operational safety of a circuit breaker device is therefore achieved according to the invention. A new architecture or design of a circuit breaker device is also proposed.

Advantageous configurations of the invention are specified in the dependent claims and in the exemplary embodiment.

In one advantageous configuration of the invention, the circuit breaker device is configured in such a manner that the level of the voltage across the electronic interruption unit is able to be determined (for one conductor).

This has the particular advantage that especially the level of the voltage between the network-side connecting point and the load-side connecting point of the electronic interruption unit is able to be determined or is determined.

To this end, at least one voltage sensor unit, which is connected to the control unit, can be provided. In the case of multiple voltage sensor units, these are connected to the control unit.

The determination of the functionality of the electronic interruption unit can be advantageously easily supported by determining the level of the voltage across the electronic interruption unit. Increased operational safety of a circuit breaker device is therefore achieved. A new architecture or design of a circuit breaker device is also proposed.

In one advantageous configuration of the invention, the circuit breaker device is configured in such a manner that, if the electronic interruption unit is switched to the high-impedance state for the first period of time, the level of the voltage across the electronic interruption unit is determined. That is to say, the level of the voltage is determined in the high-impedance state. If a first voltage threshold value is fallen below, there is a first fault condition that initiates the electronic interruption unit changing to the high-impedance state again or/and initiates opening of the contacts.

This has the particular advantage that the electronic interruption unit is checked during ongoing operation and avoidance of a current flow in the low-voltage circuit is initiated if the electronic interruption unit is faulty, with the result that there is a safe state.

The first voltage threshold value could be a root-mean-square value/mean value/RMS value of the AC voltage. The first voltage threshold value could be an instantaneous value of the voltage. The comparison can be carried out using root-mean-square values or temporal instantaneous values.

The first voltage threshold value can be, for example, 5-15% of the nominal voltage of the low-voltage circuit, for example 10%, which applies, e.g., to the root-mean-square values of the voltage. The first voltage threshold value can be, for example, 5-15% below the expected or determined instantaneous level of the voltage at the network side of the circuit breaker device, for example 10%.

The first voltage threshold value may be dimensioned on the basis of the impedance or the resistance of the load or the load current, in particular the current that has previously flowed.

This has the particular advantage that the switch-off behavior or the ability of the electronic interruption unit to be switched off is checked easily during ongoing operation.

Furthermore, in the case of an energy absorber or overvoltage protection means within the electronic interruption unit, its functionality can also be advantageously tested. If current has previously flowed in the low-voltage circuit, the freewheeling current through or the resulting voltage across the energy absorber can be checked after the interruption unit has changed to the high-impedance state. If the electronic interruption unit is opened when there is a current flow, the voltage (on account of the inductance in the line circuit) increases to the voltage of the overvoltage protection means. The functionality of the energy absorber can therefore be checked. The electronic interruption unit can advantageously change to the high-impedance state at the zero crossing of the current. This has the particular advantage that there is no chopping of the current. Furthermore, since the load is not supplied with any current at this moment, the measurement has less effect on the load. Furthermore, a commutation process (decrease in the current in the inductive circuit) does not take place and the electronic interruption unit (including the energy absorber) can turn off immediately.

In one advantageous configuration of the invention, the electronic interruption unit is switched to a high-impedance state when the instantaneous value of the voltage between the network-side neutral conductor connection and the network-side phase conductor connection exceeds a second voltage threshold value, in particular when the instantaneous value of the voltage is at a maximum.

This has the particular advantage that the supply of energy is briefly interrupted at a maximum of the available energy. Furthermore, the electronic interruption unit is checked under maximum voltage, with the result that a malfunction can be identified in good time.

The second voltage threshold value may be, for example, greater than 160 V, 200 V, 240 V or 300 V (any intermediate value is likewise possible). The instantaneous value of the voltage at a maximum is 325 volts (in the case of a 230 volt network).

In one advantageous configuration of the invention, the circuit breaker device is configured in such a manner that, if the contacts of the mechanical isolating contact unit are closed and the electronic interruption unit has been switched to the low-impedance state, the level of the voltage across the electronic interruption unit is determined. If a third voltage threshold value is exceeded, there is a second fault condition that initiates the electronic interruption unit changing to the high-impedance state again or/and initiates opening of the contacts.

This has the particular advantage that the electronic interruption unit is checked (again) (without switching) during ongoing operation and avoidance of a current flow in the low-voltage circuit is initiated if the electronic interruption unit is faulty, with the result that there is a safe state.

The third voltage threshold value should be less than 1 V. In the ideal case, the voltage across the electronic interruption unit in the low-impedance state is zero or close to zero volts (less than 1 volt).

In one advantageous configuration of the invention, a first voltage sensor unit, which is connected to the control unit, is provided and determines the level of a first voltage between a network-side connecting point and a load-side connecting point of the electronic interruption unit.

This has the particular advantage that there is a simple solution with only one voltage sensor unit.

In one advantageous configuration of the invention, a second voltage sensor unit, which is connected to the control unit, is alternatively provided and determines the level of a second voltage between the network-side neutral conductor connection and the network-side phase conductor connection. Furthermore, a third voltage sensor unit, which is connected to the control unit, is provided and determines the level of a third voltage between the network-side neutral conductor connection and the load-side connecting point of the electronic interruption unit. The circuit breaker device is configured in such a manner that the level of a/the first voltage between the network-side connecting point and the load-side connecting point of the electronic interruption unit is determined from the difference between the second and third voltages.

This has the particular advantage that there is a further solution based on conventional voltage measurements. In addition, a further-reaching check of the circuit breaker device is enabled.

In one advantageous configuration of the invention, the current sensor unit is provided on the circuit side between the network-side phase conductor connection and the load-side phase conductor connection.

This has the particular advantage that a compact two-part design of the device is provided, with an electronic interruption unit in the phase conductor in addition to the current sensor unit, on the one hand, and a continuous neutral conductor, on the other hand. Furthermore, further monitoring of currents both in the circuit itself and in the case of ground fault currents is achieved with a current sensor unit in the phase conductor.

In one advantageous configuration of the invention, the low-voltage circuit is a three-phase AC circuit. The circuit breaker device has further network-side and load-side phase conductor connections, in order to protect the phases of the electrical circuit. Between each of the network-side and load-side phase conductor connections, in each case an electronic interruption unit is provided with a voltage determination means according to the invention, in particular first voltage sensor units. In addition, a contact of the mechanical isolating contact unit is provided between each of the network-side and load-side phase conductor connections.

This has the particular advantage that three-phase AC circuits can be protected.

In one advantageous configuration of the invention, the circuit breaker device is configured in such a manner that the contacts of the mechanical isolating contact unit can be opened, but not closed, by the control unit.

This has the particular advantage that increased operational safety is achieved since the contacts cannot be inadvertently closed by the control unit.

In one advantageous configuration of the invention, the mechanical isolating contact unit is able to be operated by means of a mechanical handle in order to switch between opening of contacts or closing of the contacts.

This has the particular advantage that there is the functionality of a conventional miniature circuit breaker.

In one advantageous configuration of the invention, an energy supply, in particular for the control unit, is provided and is connected to the network-side neutral conductor connection and to the network-side phase conductor connection.

In particular, a fuse, in particular a safety fuse, is provided in the link to the network-side neutral conductor connection.

This has the particular advantage that a compact electronic assembly is enabled. Furthermore, there is only a cross-connection between the phase conductor and the neutral conductor, with the result that a fault in the device, which would cause a short circuit here, can be easily protected.

In one advantageous configuration of the invention, if the contacts of the mechanical isolating contact unit are closed and the interruption unit is in the low-impedance state and

- if a current that exceeds a first current value is determined, in particular the first current value is exceeded for a first time limit, the electronic interruption unit changes to the high-impedance state and the mechanical isolating contact unit remains closed,
- if a current that exceeds a (higher) second current value, in particular for a second time limit, is determined, the electronic interruption unit changes to the high-impedance state and the mechanical isolating contact unit is opened,
- if a current that exceeds an (even higher) third current value is determined, the electronic interruption unit changes to the high-impedance state and the mechanical isolating contact unit is opened.

This has the particular advantage that there is a graduated switch-off concept in the case of increased currents for a circuit breaker device according to the invention.

In one advantageous configuration of the invention, the control unit has a microcontroller.

This has the particular advantage that the functions according to the invention for increasing the safety of a circuit breaker device or of the electrical low-voltage circuit to be protected can be achieved by means of an (adaptable) computer program product. Furthermore, changes and improvements in the function can be thereby individually loaded onto a circuit breaker device.

The invention claims a corresponding method for a circuit breaker device for a low-voltage circuit having electronic (semiconductor-based) switching elements with the same and further advantages.

The method for a circuit breaker device for protecting an electrical low-voltage circuit, having:

- a housing with at least one network-side connection and one load-side connection,
- a mechanical isolating contact unit, which is connected in series with an electronic interruption unit, wherein the mechanical isolating contact unit is assigned to the load-side connection and the electronic interruption unit is assigned to the network-side connection,
- wherein the mechanical isolating contact unit is able to be switched by opening contacts in order to avoid a current flow or closing the contacts for a current flow in the low-voltage circuit,
- wherein the electronic interruption unit (EU) is able to be switched, by means of semiconductor-based switching elements, to a high-impedance state of the switching elements in order to avoid a current flow or a low-impedance state of the switching elements for the current flow in the low-voltage circuit,
- wherein the level of the current in the low-voltage circuit, in particular between the network-side phase conductor connection and the load-side phase conductor connection, is determined,
- wherein avoidance of a current flow in the low-voltage circuit is initiated if current limit values or/and current-time limit values are exceeded.

For functional testing of the circuit breaker device if the contacts of the mechanical isolating contact unit are closed and the electronic interruption unit has been switched to the low-impedance state, the electronic interruption unit is switched to a high-impedance state for a first period of time.

If the electronic interruption unit is switched to the high-impedance state for the first period of time, the level of the voltage across the electronic interruption unit is determined. That is to say, the level of the voltage is determined in the high-impedance state. If a first voltage threshold value is fallen below, there is a first fault condition that initiates the electronic interruption unit changing to the high-impedance state again or/and initiates opening of the contacts.

Advantageously, the electronic interruption unit is switched to a high-impedance state when the instantaneous value of the voltage between the network-side neutral conductor connection and the network-side phase conductor connection exceeds a second voltage threshold value, in particular when the instantaneous value of the voltage is at a maximum.

Advantageously, if the contacts of the mechanical isolating contact unit are closed and the electronic interruption unit has been switched to the low-impedance state, the level of the voltage across the electronic interruption unit is determined. If a third voltage threshold value is exceeded, there is a second fault condition that initiates the electronic interruption unit changing to the high-impedance state again or/and initiates opening of the contacts.

The invention claims a corresponding computer program product. The computer program product comprises instructions, which, when the program is executed by a microcontroller, cause the latter to improve the safety of such a circuit breaker device or to achieve a higher degree of safety in the electrical low-voltage circuit to be protected by the circuit breaker device.

The microcontroller is part of the circuit breaker device, in particular of the control unit.

The invention claims a corresponding computer-readable storage medium on which the computer program product is stored.

The invention claims a corresponding data carrier signal, which transmits the computer program product.

All configurations, both in dependent form referring back to the independent patent claims, and referring back only to individual features or combinations of features of patent claims, in particular also a reference of the dependent arrangement claims back to the independent method claim, improve a circuit breaker device, in particular improve the safety of a circuit breaker device or of the electrical circuit, and provide a new concept for a circuit breaker device.

The described properties, features and advantages of this invention and the manner in which they are achieved become clearer and more distinctly comprehensible in connection with the following description of the exemplary embodiments, which are explained in more detail in connection with the drawing.

DETAILED DESCRIPTION OF THE INVENTION

Figure 1:
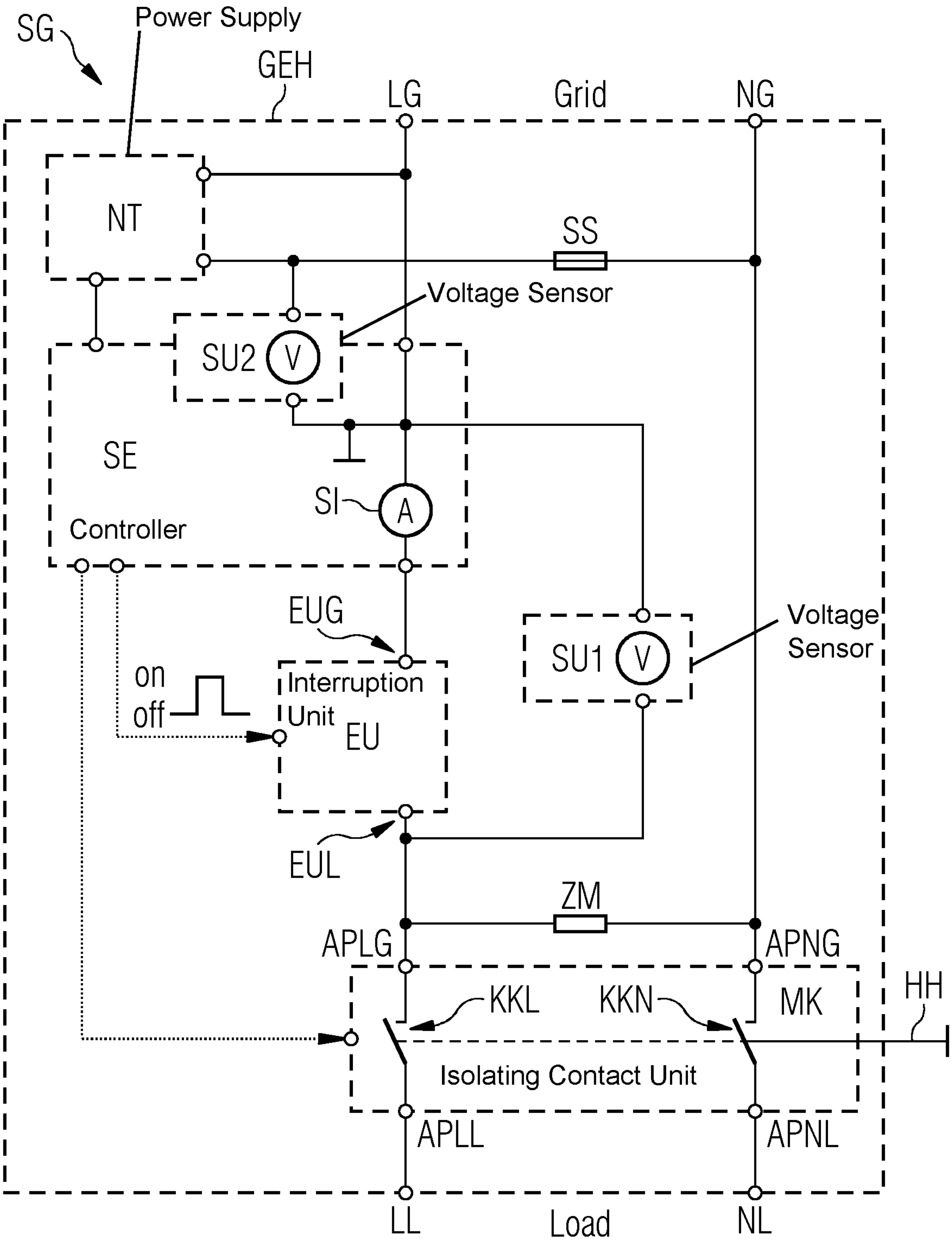
FIG. 1 shows a first illustration of a circuit breaker device.

FIG. 1 shows an illustration of a circuit breaker device SG for protecting an electrical low-voltage circuit, in particular a low-voltage AC circuit, having a housing GEH, having:

- a network-side neutral conductor connection NG, a network-side phase conductor connection LG, a load-side neutral conductor connection NL, a load-side phase conductor connection LL of the low-voltage circuit;

an energy source is usually connected to the network side GRID;

a consumer is usually connected to the load side LOAD;

- a (two-pole) mechanical isolating contact unit MK having load-side connection points APLL, APNL and network-side connection points APLG, APNG, wherein a load-side connection point APNL is provided for the neutral conductor, a load-side connection point APLL is provided for the phase conductor, a network-side connection point APNG is provided for the neutral conductor, and a network-side connection point APLG is provided for the phase conductor. The load-side connection points APNL, APLL are connected to the load-side neutral and phase conductor connections NL, LL, with the result that it is possible to switch between opening of contacts KKN, KKL in order to avoid a current flow or closing of the contacts for a current flow in the low-voltage circuit, an electronic interruption unit EU, in particular a single-pole electronic interruption unit (which is arranged, in particular, in the phase conductor in the case of a single-pole design), having a network-side connecting point EUG, which is electrically connected to the network-side phase conductor connection LG, and a load-side connecting point EUL, which is electrically connected to the network-side connection point APLG of the mechanical isolating contact unit MK, wherein the electronic interruption unit has, by virtue of semiconductor-based switching elements, a high-impedance state of the switching elements in order to avoid a current flow or a low-impedance state of the switching elements for the current flow in the low-voltage circuit, a current sensor unit SI for determining the level of the current of the low-voltage circuit, which current sensor unit is arranged, in particular, in the phase conductor, a control unit SE, which is connected to the current sensor unit SI, the mechanical isolating contact unit MK and the electronic interruption unit EU, wherein avoidance of a current flow in the low-voltage circuit is initiated if current limit values or/and current-time limit values are exceeded.

According to the invention, the circuit breaker device is configured in such a manner that the level of the voltage across the electronic interruption unit is advantageously able to be determined. That is to say, the level of a first voltage between the network-side connecting point EUG and the load-side connecting point EUL of the electronic interruption unit EU is able to be determined or is determined.

To this end, in the example according to FIG. 1, a first voltage sensor unit SU1, which is connected to the control unit SE, is provided and determines the level of the voltage between the network-side connecting point EUG and the load-side connecting point EUL of the electronic interruption unit EU.

Alternatively, during the voltage measurement by the first voltage sensor unit SU1, the voltage across the series circuit of the electronic interruption unit EU and the current sensor SI can also be determined, as illustrated in FIG. 1. The current sensor unit SI has a very low internal resistance, with the result that the determination of the level of the voltage is not impaired or is negligibly impaired.

Advantageously, a second voltage sensor unit SU2 can be provided and determines the level of the voltage between the network-side neutral conductor connection NG and the network-side phase conductor connection LG.

The first voltage sensor unit can also be replaced by using two voltage measurements (upstream of the electronic interruption unit and downstream of the electronic interruption unit). The voltage across the electronic interruption unit is determined by forming a difference.

A/the second voltage sensor unit SU2, which is connected to the control unit SE may therefore be provided and determines the level of a second voltage between the network-side neutral conductor connection (NG) and the network-side phase conductor connection (LG). Furthermore, a third voltage sensor unit SU3 (not illustrated), which is connected to the control unit, may be provided and determines the level of a third voltage between the network-side neutral conductor connection NG and the load-side connecting point EUL of the electronic interruption unit EU. The circuit breaker device is configured in such a manner that the level of a/the first voltage between the network-side connecting point EUG and the load-side connecting point EUL of the electronic interruption unit EU is determined from the difference between the second and third voltages.

A measurement impedance ZM may be connected between the network-side connection points APLG, APNG of the mechanical isolating contact unit MK. The measurement impedance ZM may be, for example, an electrical resistor or/and capacitor. The measurement impedance may also be an inductor. In particular, the measurement impedance may be a series circuit or parallel circuit of a resistor or/and a capacitor or/and an inductor.

In the example according to FIG. 1, the electronic interruption unit EU has a single-pole design, in the phase conductor in the example. In this case, the network-side connection point APNG for the neutral conductor of the mechanical isolating contact unit MK is connected to the network-side neutral conductor connection NG of the housing GEH.

The circuit breaker device SG is advantageously configured in such a manner that the contacts of the mechanical isolating contact unit MK can be opened, but not closed, by the control unit SE, which is indicated by an arrow from the control unit SE to the mechanical isolating contact unit MK.

The mechanical isolating contact unit MK is able to be operated by means of a mechanical handle HH on the circuit breaker device SG in order to switch manual opening or closing of the contacts KKL, KKN. The mechanical handle HH indicates the switching state (open or closed) of the contacts of the mechanical isolating contact unit MK on the circuit breaker device. Furthermore, the contact position (or the position of the handle, closed or open) is able to be transmitted to the control unit SE. The contact position (or the position of the handle) can, for example, be determined by means of a sensor.

The mechanical isolating contact unit MK is advantageously configured in such a manner that (manual) closing of the contacts by means of the mechanical handle is possible only after an enable (enable), in particular an enable signal. This is likewise indicated by the arrow from the control unit SE to the mechanical isolating contact unit MK. That is to say, the contacts KKL, KKN of the mechanical isolating contact unit MK may be closed by means of the handle HH only when the enable or the enable signal (from the control unit) is present. Without the enable or the enable signal, the handle HH can be actuated, but the contacts cannot be closed ("permanent slider contacts").

The circuit breaker device SG has an energy supply NT, for example a power supply unit. In particular, the energy supply NT is provided for the control unit SE, which is indicated by a link between the energy supply NT and the control unit SE in FIG. 1. The energy supply NT is connected (on the other hand) to the network-side neutral conductor connection NG and the network-side phase conductor connection LG. A fuse SS, in particular a safety fuse, may be advantageously provided in the link to the network-side neutral conductor connection NG (or/and phase conductor connection LG).

Alternatively, the measurement impedance ZM may be connected to the network-side neutral conductor connection NG via the fuse SS. This advantageously makes it possible to implement a three-pole electronic unit EE (FIG. 6), for example in the form of a module, which has three connection points, one neutral conductor connection point and two phase conductor connection points. The electronic unit EE has, for example, the electronic interruption unit EU, the control unit SE, the energy supply NT (in particular including the fuse SS), the current sensor unit SI, the first voltage sensor unit SU1 and optionally the second voltage sensor unit SU2.

The low-voltage circuit may be a three-phase AC circuit having one neutral conductor and three phase conductors. For this purpose, the circuit breaker device may be configured as a three-phase variant and may have, for example, further network-side and load-side phase conductor connections. In a similar manner, electronic interruption units according to the invention and voltage determination means (for example by means of first voltage sensor units) are respectively provided between the further network-side and load-side phase conductor connections. Likewise contacts of the mechanical isolating contact unit.

High impedance is used to mean a state in which only a current of a negligible magnitude flows. In particular, high impedance is used to mean resistance values of greater than 1 kilohm, preferably greater than 10 kilohms, 100 kilohms, 1 megaohm, 10 megaohms, 100 megaohms, 1 gigaohm or greater.

Low impedance is used to mean a state in which the current value indicated on the circuit breaker device could flow. In particular, low impedance is used to mean resistance values of less than 10 ohms, preferably less than 1 ohm, milliohms, 10 milliohms, 1 milliohm or less.

Figure 2:
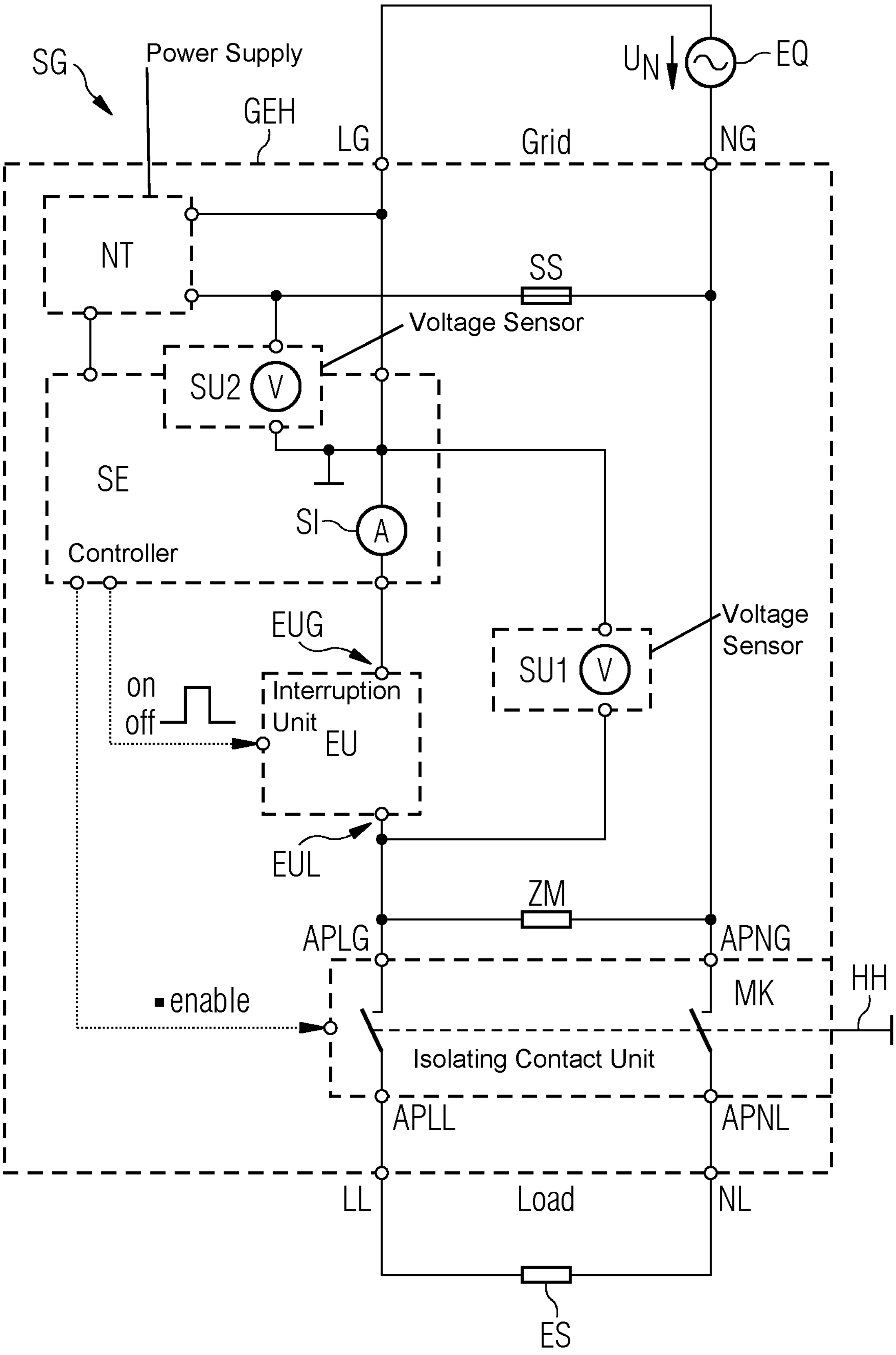
FIG. 2 shows a second illustration of a circuit breaker device.

FIG. 2 shows a representation according to FIG. 1, with the difference that an energy source EQ with a nominal voltage $U_N$ of the low-voltage circuit is connected to the network side GRID. A consumer or energy sink ES is also connected to the load side LOAD.

Furthermore, an enable signal enable is depicted for the link from the control unit SE to the mechanical isolating contact unit MK.

The mechanical isolating contact unit MK is illustrated in an open state OFF, that is to say with open contacts KKN, KKL in order to avoid a current flow.

The circuit breaker device SG operates, in principle, for example, in such a manner that, if the contacts of the mechanical isolating contact unit are closed and the interruption unit is in the low-impedance state and

- if a current that exceeds a first current value is determined, in particular the first current value is exceeded for a first time limit, the electronic interruption unit EU changes to the high-impedance state and the mechanical isolating contact unit MK remains closed,
- if a current that exceeds a higher second current value, in particular for a second time limit, is determined, the electronic interruption unit EU changes to the high-impedance state and the mechanical isolating contact unit MK is opened,
- if a current that exceeds an even higher third current value is determined, the electronic interruption unit changes to the high-impedance state and the mechanical isolating contact unit MK is opened.

Figure 3:
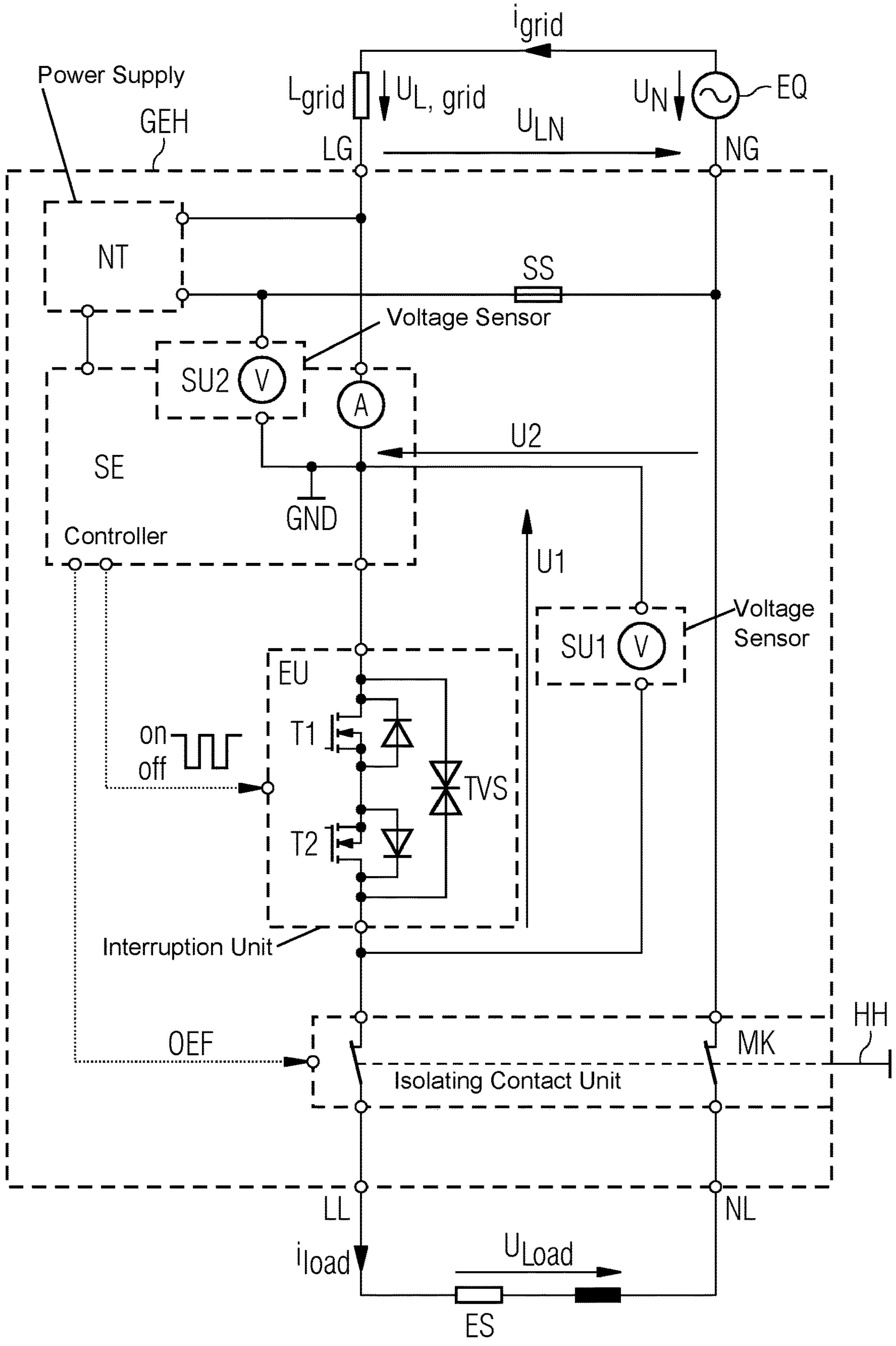
FIG. 3 shows a third illustration of a circuit breaker device.

FIG. 3 shows an illustration according to FIG. 2, with various differences. The voltages at and in the circuit breaker device are illustrated in more detail:

- the nominal voltage $U_N$ of the energy source EQ of the low-voltage circuit,
- the network voltage $U_{LN}$ applied between the network-side neutral conductor connection NG and the network-side phase conductor connection LG,
- the second voltage U2 or $U_{N,\ GND}$ measured in the circuit breaker device by the second voltage sensor unit SU2,
- the first voltage U1 or $U_{SW}$ measured across the electronic interruption unit EU using the first voltage sensor unit SU1.

In this variant according to FIG. 3, the first voltage U1 (or $U_{SW}$) is measured directly across the electronic interruption unit (that is to say without a current sensor unit SI). The second voltage U2 (or $U_{N,\ GND}$) corresponds to the network voltage $U_{LN}$ minus the (minimum) voltage drop across the current sensor unit SI and the resistive losses.

A detail of the electronic interruption unit EU is also illustrated, wherein the (single-pole) electronic interruption unit EU has semiconductor-based switching elements T1, T2. In the example according to FIG. 3, two semiconductor-based switching elements T1, T2 connected in series are provided. An overvoltage protection device TVS is advantageously provided across the series circuit of the two semiconductor-based switching elements T1, T2.

In the configuration according to FIG. 3, two unidirectional electronic switching elements are connected in series (in antiseries). The first unidirectional switching element is arranged in this case such that it is able to be switched in a first current direction and the second unidirectional switching element is arranged such that it is able to be switched in the opposite current direction, wherein the unidirectional switching elements are conductive counter to their current switching direction (directly or indirectly, for example by means of internal or external diodes connected in parallel). In particular, the circuit breaker device is configured in such a manner that the first and second switching elements are able to be switched independently of one another.

The following situation is considered below:

- nominal voltage or network voltage (for example 230 V AC) is applied to the network-side connection LG, NG or network side GRID or network connection of the circuit breaker device,
- a consumer or an energy sink ES or a load is connected to the load side LOAD of the circuit breaker device.

FIG. 3 also shows the difference that the contacts of the mechanical isolating contact unit MK are closed and the electronic interruption unit is in the low-impedance state. The circuit breaker device is configured in such a manner that, if the contacts of the mechanical isolating contact unit MK are closed and the electronic interruption unit EU has been switched to the low-impedance state, the level of the voltage across the electronic interruption unit is determined. If the third voltage threshold value is exceeded, there is a second fault condition that initiates the electronic interruption unit changing to the high-impedance state or/and initiates opening of the contacts.

The circuit breaker device is also configured in such a manner that, if the contacts of the mechanical isolating contact unit MK are closed and the electronic interruption unit EU has been switched to the low-impedance state, the electronic interruption unit EU is switched to a high-impedance state for the first period of time and the level of the voltage across the electronic interruption unit is determined. If the first voltage threshold value is fallen below, there is a first fault condition that initiates the electronic interruption unit changing to the high-impedance state or/and initiates opening of the contacts.

Figure 5:
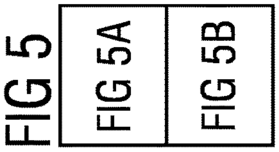
FIG. 5 shows an illustration with second voltage profiles.
Figure 5A:
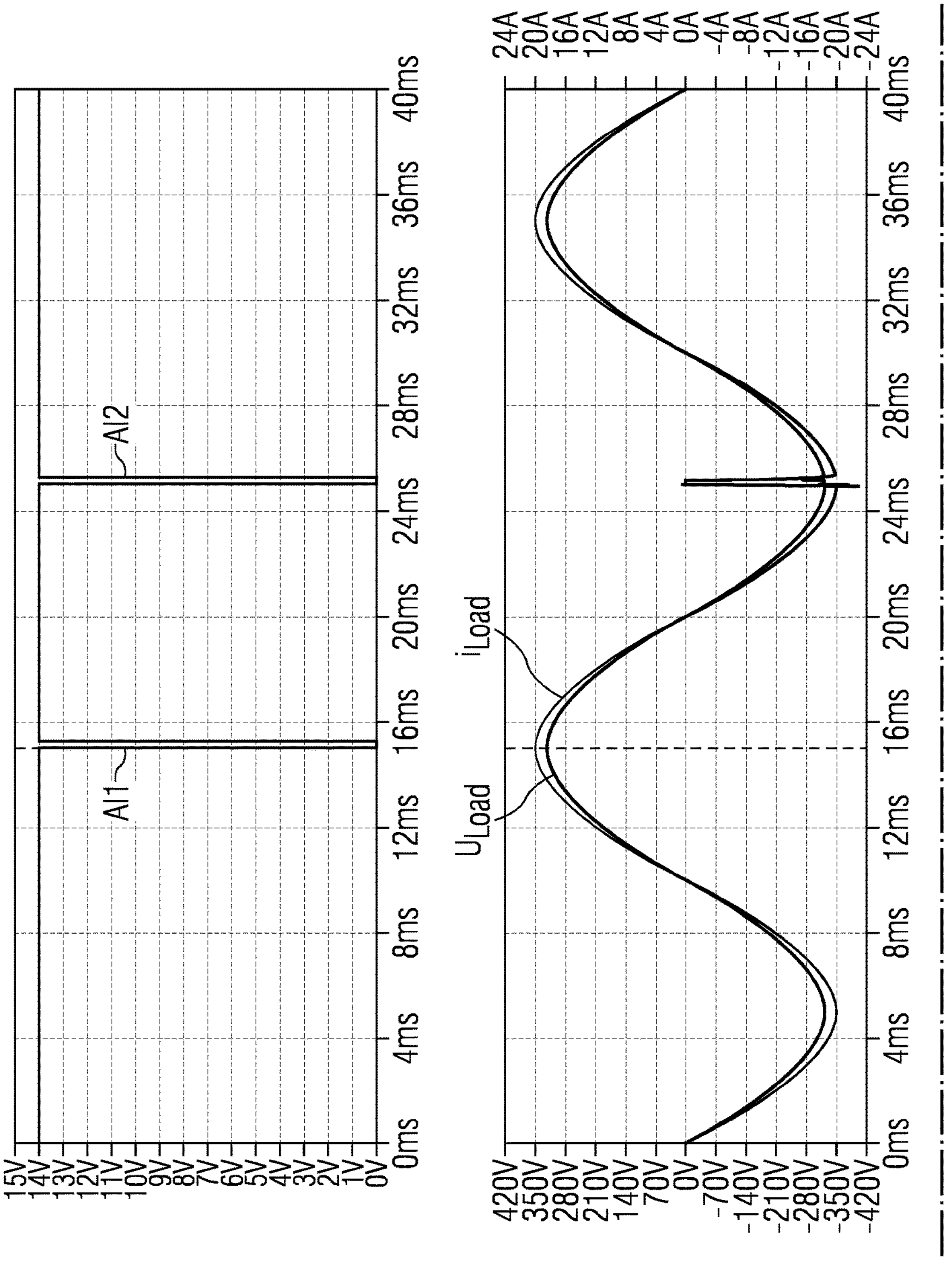
Figure 5B:
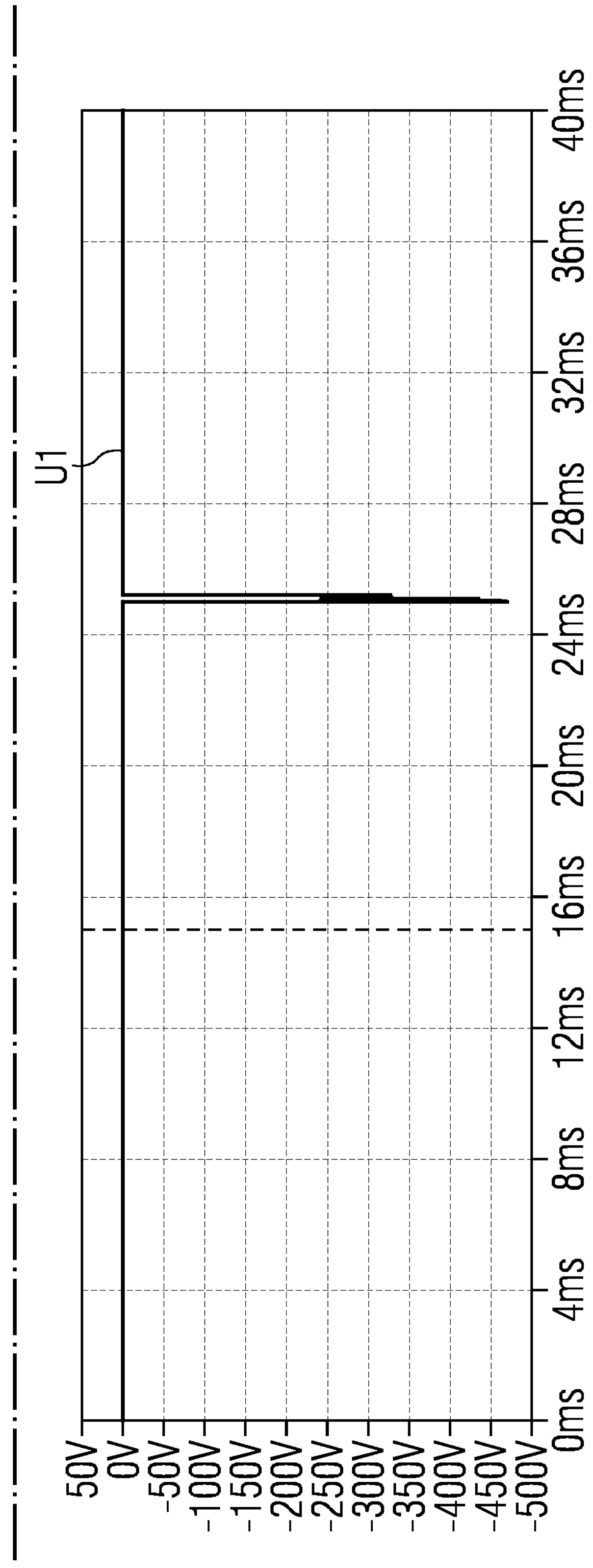

This is indicated in FIG. 5 by virtue of the link between the control unit SE and the electronic interruption unit EU having a square-wave signal which is in the on state (on) and is briefly switched to the off state (off). That is to say, the electronic interruption unit EU is briefly (first period of time) switched to a high-impedance state. The electronic interruption unit can optionally be repeatedly switched to the high-impedance state in order to test the functionality, which, for example, is indicated by two successive off states (off) of the square-wave signal.

If the first or second fault condition is present, an opening signal OEF is sent from the control unit SE to the mechanical isolating contact unit MK in order to initiate opening of the contacts, as indicated in FIG. 5. The control unit SE may also send a signal (not depicted) for changing to the high-impedance state to the electronic interruption unit (or avoid a corresponding low-impedance signal). The mechanical contacts are preferably opened shortly before the current zero crossing, with the result that the mechanical switching contacts can interrupt the current flow more easily, and contact erosion or an arc is avoided.

The electronic interruption unit is advantageously switched to a high-impedance state when the instantaneous value of the voltage between the network-side neutral conductor connection and the network-side phase conductor connection exceeds a second voltage threshold value, in particular when the instantaneous value of the voltage is at a maximum.

FIG. 3 also depicts a network-side line inductor $L_{grid}$ with an associated voltage drop $U_{Lgrid}$ and a network-side current $i_{grid}$. The load-side current $i_{load}$ is also depicted in addition to the load-side voltage drop $U_{Load}$ across the consumer or energy sink ES. The energy sink ES is illustrated with its inductive and resistive components.

Figure 4:
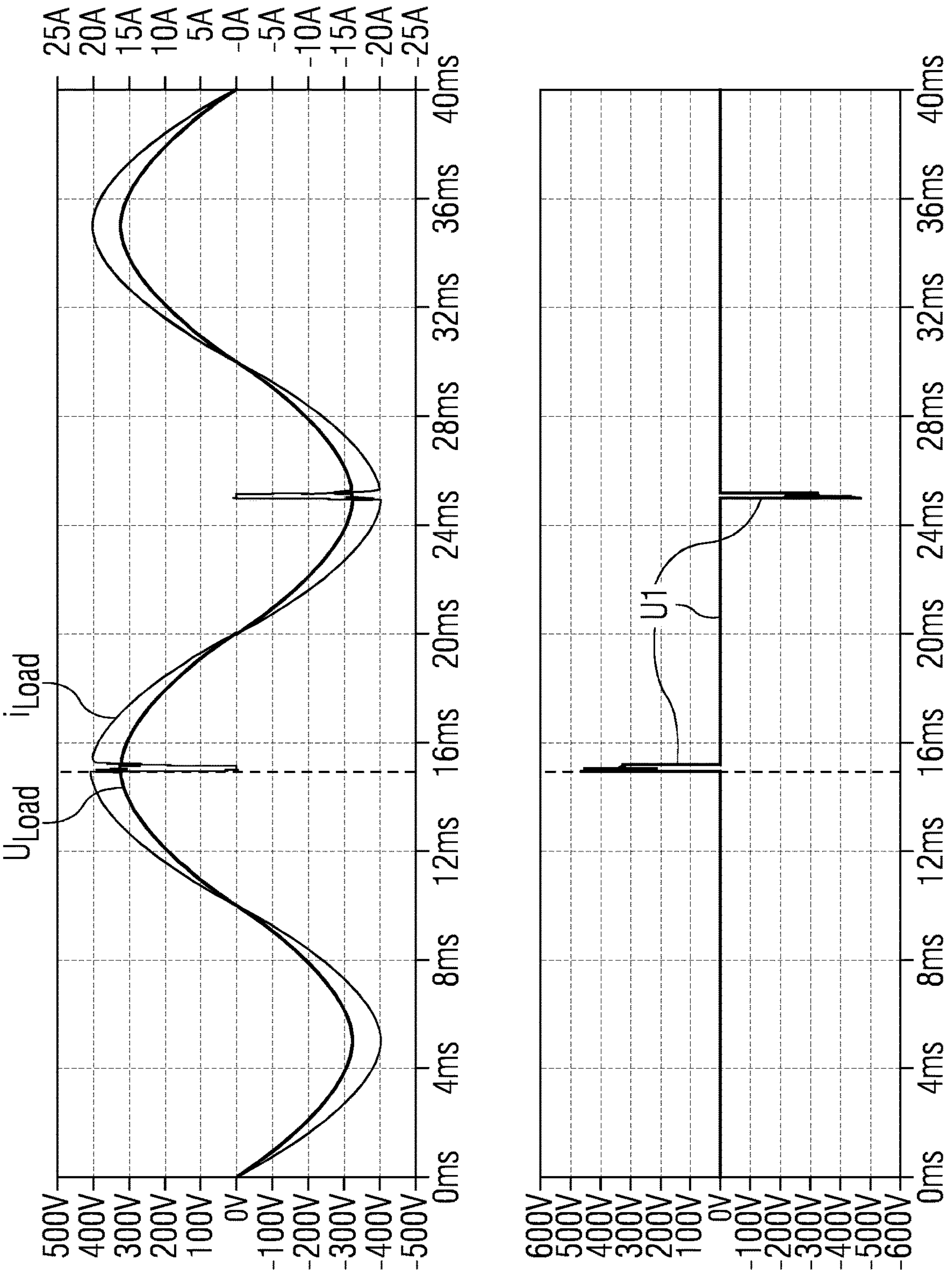
FIG. 4 shows an illustration with first voltage profiles.

FIG. 4 shows graphs with voltage and current profiles during testing by briefly switching off the electronic interruption unit (for a functional circuit breaker device).

The level of the voltage in volts V and of the current in amperes A is plotted on the vertical y axis and the time in milliseconds ms is plotted on the horizontal x axis.

The upper graph from FIG. 4 illustrates the load-side voltage $U_{Load}$ and the load-side current $i_{load}$. Brief voltage and current dips at the time when the electronic interruption unit changes to the high-impedance state—for a first period of time—can be seen. In the example, when the voltage or the current is at a maximum, that is to say when the instantaneous value of the voltage or current is at a maximum.

If the first voltage U1 across the electronic interruption unit/the semiconductor-based switching element is positive, the switching element T2, for example, can be checked. If the first voltage U1 across the electronic interruption unit/the semiconductor-based switching element is negative, the switching element T1, for example, can be checked.

FIG. 5 shows voltage and current profiles according to FIG. 4. The upper graph in FIG. 5 depicts a first switch-off pulse AI1 at the time t=16 ms and a second switch-off pulse AI2 at the time t=25 ms for the semiconductor-based switching elements.

The middle graph illustrates the load-side voltage profile $U_{Load}$ and the load-side current profile $i_{load}$. During the first switch-off pulse AI1, neither a load-side voltage dip nor a load-side current dip can be detected. During the second switch-off pulse AI2, there is a brief load-side voltage dip and current dip.

The lower graph depicts the profile of the first voltage U1. A voltage peak of the first voltage U1 can be seen at the time of the second switch-off pulse AI2.

FIG. 5 shows the voltage profiles during testing by briefly switching off the switching elements in the case of a defective circuit breaker device. It can be seen that no switching-off takes place during the positive half-wave (no voltage peak of the first voltage U1). This fault pattern occurs, for example, in the case of a broken-down switching element, with the result that a broken-down switching element, for example switching element T2, can be inferred from this.

Switching-off takes place in the event of the negative half-wave (voltage peak of the first voltage U1). That is to say, for example, the switching element T1 is (still) in working order.

If the first voltage U1 across the electronic switching element is positive, a switching element T2, for example, can be checked. If the first voltage U1 across the electronic switching element is negative, the other switching element T1, for example, can be checked (in the case of unidirectional switching elements).

Figure 6:
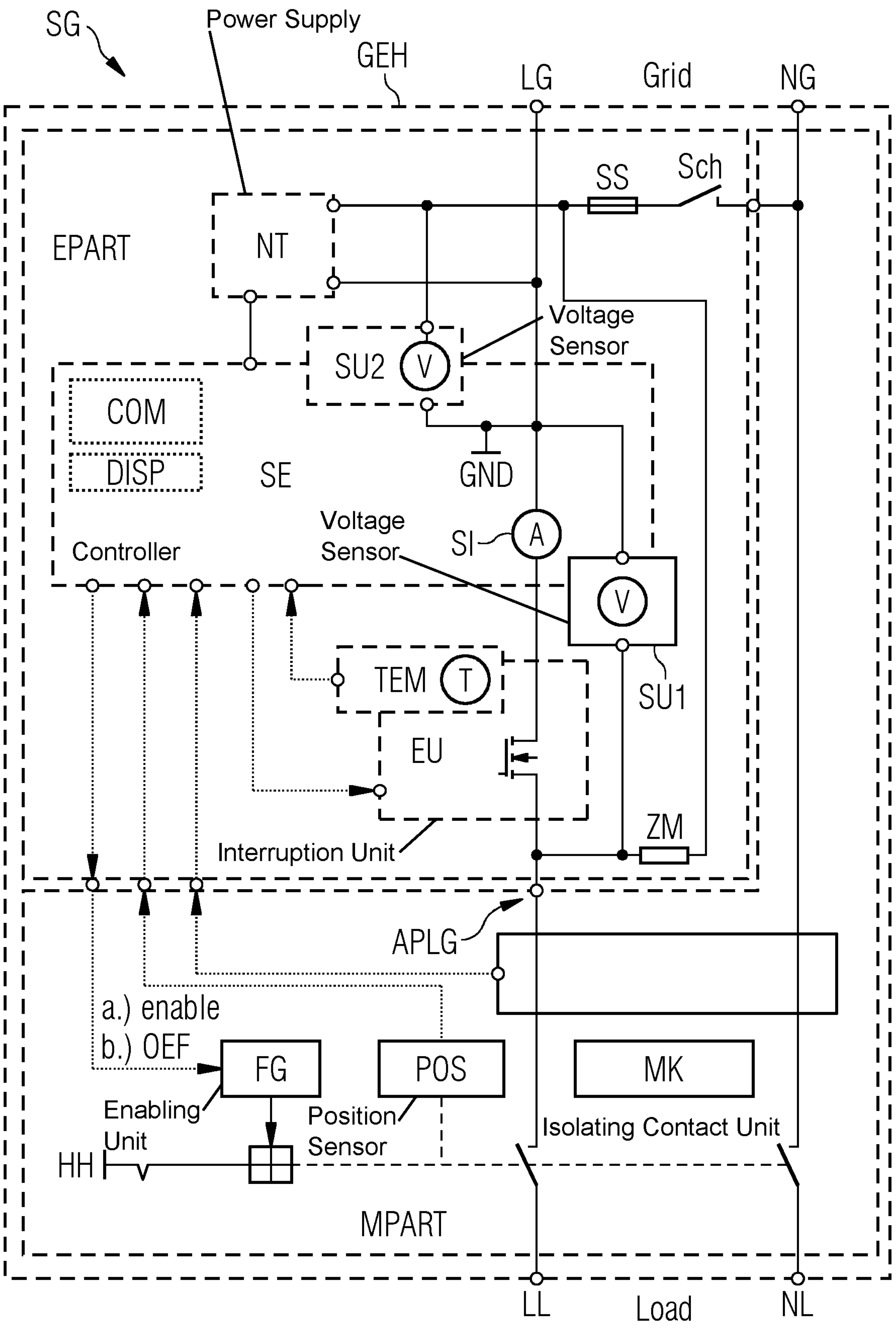
FIG. 6 shows a fourth illustration of a circuit breaker device.

FIG. 6 shows an illustration according to FIGS. 1-3, with the difference that the circuit breaker device has a two-part design. It contains an electronic first part EPART, for example on a printed circuit board. The first part EPART may have the control unit SE, the first voltage sensor unit SU1, the second voltage sensor unit SU2, the current sensor unit SI, the electronic interruption unit EU and the energy supply NT. The first part may also have the safety fuse SS, a switch SCH, the measurement impedance ZM, a temperature sensor TEM (in particular for the electronic interruption unit EU), a communication unit COM, and a display unit DISP.

The first part EPART has only three connections:

the network-side phase conductor connection LG, a connection for or to the network-side phase conductor connection point APLG of the mechanical isolating contact unit MK, a connection for a link to the network-side neutral conductor connection NG.

The circuit breaker device contains a second part MPART, in particular a mechanical second part. The second part MPART may have the mechanical isolating contact unit MK, the handle HH and an enabling unit FG. The second part may also have a position unit POS for reporting the position of the contacts of the mechanical isolating contact unit MK to the control unit and the (neutral conductor) link(s).

Further units, which are not described in any more detail, may be provided.

A compact circuit breaker device according to the invention can be advantageously implemented by virtue of the two-part design.

The enabling unit FG enables the actuation of the contacts of the mechanical isolating contact unit by means of the handle HH if there is an enable signal enable. Furthermore, the enabling unit FG may cause the contacts to be opened if there is an opening signal OEF. The enabling unit then acts as a tripping unit.

The invention shall be summarized and explained in more detail again below.

Proposed by way of example is an electronic circuit breaker device having:

a housing with network-side and load-side connections a voltage sensor unit for measuring the network voltage a current sensor unit for measuring the (load) current a mechanical isolating contact unit including a handle (including an indication of the contact position, a release by means of the electronics, isolator properties)

an electronic interruption unit having semiconductor-based switching elements a control unit the functionality of the electronic interruption unit is checked by briefly (<10 ms, preferably <1 ms) switching the electronic interruption unit off and immediately on again, and simultaneously recording voltage measured values and/or current measured values and analyzing them such that a broken-down or blown electronic interruption unit is identified or broken-down or blown switching elements are identified.

The functionality of the electronic interruption unit is also tested by continuously measuring the voltage across the electronic interruption unit.

In this case, it is possible to detect, for example in the switched-on state, that a semiconductor has blown.

A first voltage sensor unit/voltage measurement unit across the electronic interruption unit is proposed in order to determine the voltage across the electronic interruption unit. Alternatively, a third voltage sensor unit may be provided in parallel with the second voltage sensor unit and is provided at the load-side connection of the electronic interruption unit, that is to say between the electronic interruption unit and the mechanical isolating contact unit, wherein the latter is connected, on the one hand, to the phase conductor and, on the other hand, to the neutral conductor. The first voltage can be determined by forming the difference of the voltages between the second and third voltage sensor units. The first voltage sensor unit may be dispensed with in this case.

The invention proposes a computer program product or algorithm, which switches the electronic interruption unit or the semiconductor-based switching elements on and off at suitable times (instantaneous values of the network voltage) and simultaneously evaluates the measured current and voltage values in order to identify whether or not the electronic interruption unit is functional.

The control unit SE may have a microcontroller (for this purpose). The computer program product can be executed on the microcontroller. The computer program product comprises instructions, which, when the program is executed by the microcontroller, cause the latter to control the circuit breaker device to support, in particular carry out, the method according to the invention, in particular.

The computer program product can be stored on a computer-readable storage medium, such as a CD-ROM, a USB stick or the like.

There may also be a data carrier signal, which transmits the computer program product.

The electronic interruption unit can be automatically cyclically checked during "normal" on operation (for example automatic check once per hour/every 45/30/15 minutes, or the like).

If the semiconductor-based switching elements are checked in the switched-on state of the electronic interruption unit by briefly switching it off and are switched in a moment in which a current flows, this may result, together with the existing line inductance, in an overvoltage being produced at the electronic switch that makes it possible to test the existing energy absorber/overvoltage protection means TVS. A functioning overvoltage protection means limits the voltage to a certain range of values of the voltage.

The time for switching the semiconductor-based switching elements (for the check) depends on the polarity of the currently applied network voltage, with the result that individual switching elements can be specifically checked. Furthermore, the instantaneous value of the voltage can be taken into account when selecting the time.

In summary:

- voltage measurement across the electronic interruption unit or determination of the voltage drop across the electronic interruption unit EU (for example using a simple voltage divider),
- voltage determination across the electronic interruption unit is used to: identify a broken-down or blown state of a power semiconductor, possibility of opening the mechanical isolating contact unit after a fault in the electronic interruption unit has been determined.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A circuit breaker for protecting an electrical low-voltage circuit, the circuit breaker comprising:

- a housing with at least one network-side connection and at least one load-side connection;
- an electronic interruption unit having semiconductor-based switching elements, said electronic interruption unit is switched, by means of said semiconductor-based switching elements, to a high-impedance state of said semiconductor-based switching elements to avoid a current flow or a low-impedance state of said semiconductor-based switching elements for the current flow in the electrical low-voltage circuit;
- a mechanical isolating contact unit connected in series with said electronic interruption unit and having contacts, wherein said mechanical isolating contact unit is assigned to said at least one load-side connection and said electronic interruption unit is assigned to said at least one network-side connection, wherein said mechanical isolating contact unit switched by opening said contacts in order to avoid the current flow or closing said contacts for the current flow in the electrical low-voltage circuit;
- a current sensor for determining a level of a current of the electrical low-voltage circuit;
- a controller connected to said current sensor, said mechanical isolating contact unit and said electronic interruption unit, wherein avoidance of the current flow in the electrical low-voltage circuit is initiated when at least one of current limit values or current-time limit values are exceeded; and
- the circuit breaker is configured such that, when said contacts of said mechanical isolating contact unit are closed and said electronic interruption unit has been switched to the low-impedance state, said electronic interruption unit is switched to the high-impedance state for a first period of time for functional testing.

2. The circuit breaker according to claim 1, wherein the circuit breaker is configured such that a level of a voltage across said electronic interruption unit is determined for one conductor of the electrical low-voltage circuit.

3. The circuit breaker according to claim 2, wherein:

- when said electronic interruption unit is switched to the high-impedance state for the first period of time, the level of the voltage across said electronic interruption unit is determined; and
- when a first voltage threshold value is fallen below, there is a first fault condition that at least one of initiates said electronic interruption unit changing to the high-impedance state again or initiates opening of said contacts.

4. The circuit breaker according to claim 3, wherein:

- said at least one network-side connection includes a network-side neutral conductor connection and a network-side phase conductor connection; and
- said electronic interruption unit is switched to the high-impedance state when an instantaneous value of a voltage between said network-side neutral conductor connection and said network-side phase conductor connection exceeds a second voltage threshold value.

5. The circuit breaker according claim 4, wherein the circuit breaker is configured such that, when said contacts of said mechanical isolating contact unit are closed and said electronic interruption unit has been switched to the low-impedance state, the level of the voltage across said electronic interruption unit is determined, in that, when a third voltage threshold value is exceeded, there is a second fault condition that at least one of initiates said electronic interruption unit changing to the high-impedance state again or initiates opening of said contacts.

6. The circuit breaker according to claim 1, wherein said electronic interruption unit has a network-side connecting point and a load-side connecting point; and further comprising a first voltage sensor connected to said controller and determining a level of a first voltage between said network-side connecting point and said load-side connecting point of said electronic interruption unit.

7. The circuit breaker according to claim 6, wherein said at least one network-side connection includes a network-side neutral conductor connection and a network-side phase conductor connection;

further comprising a second voltage sensor connected to said controller and determining a level of a second voltage between said network-side neutral conductor connection and said network-side phase conductor connection;

further comprising a third voltage sensor connected to said controller and determining a level of a third voltage between said network-side neutral conductor connection and said load-side connecting point of said electronic interruption unit; and wherein the circuit breaker is configured such that the level of the first voltage between said network-side connecting point and said load-side connecting point of said electronic interruption unit is determined from a difference between the second and third voltages.

8. The circuit breaker according to claim 1, wherein:

said at least one network-side connection includes a network-side neutral conductor connection and a network-side phase conductor connection;

said at least one load side connection includes a load-side phase conductor connection; and said current sensor is provided on a circuit side between said network-side phase conductor connection and said load-side phase conductor connection.

9. The circuit breaker according to claim 1, wherein the electrical low-voltage circuit is a three-phase AC circuit;

wherein said at least one network-side connection is one of a plurality of network-side connections;

wherein said at least one load-side connection is one of a plurality of load-side connections;

said electronic interruption unit is one of a plurality of electronic interruption units each having contacts;

wherein between each of said network-side connections and said load-side connections a contact of said contacts of said mechanical isolating contact unit and a contact of said contacts of one of said electronic interruption units are provided; and further comprising voltage sensors, using said voltage sensors a level of a voltage across a respective one of said electronic interruption units is determined.

10. The circuit breaker according to claim 1, wherein the circuit breaker is configured such that said contacts of said mechanical isolating contact unit can be opened, but not closed, by said controller.

11. The circuit breaker according to claim 1, wherein said mechanical isolating contact unit has a mechanical handle and is operated by means of said mechanical handle to switch between opening of said contacts or closing of said contacts.

12. The circuit breaker according to claim 1, wherein when said contacts of said mechanical isolating contact unit are closed and said interruption unit is in the low-impedance state and:

when the current that exceeds a first current value is determined, said electronic interruption unit changes to the high-impedance state and said mechanical isolating contact unit remains closed;

when the current that exceeds a second current value is determined, said electronic interruption unit changes to the high-impedance state and said mechanical isolating contact unit is opened; and when the current that exceeds a third current value is determined, said electronic interruption unit changes to the high-impedance state and said mechanical isolating contact unit is opened.

13. The circuit breaker according to claim 1, wherein said controller has a microcontroller.

14. A method for operating a circuit breaker for protecting an electrical low-voltage circuit, the circuit breaker containing:

a housing with at least one network-side connection and at least one load-side connection;

an electronic interruption unit having semiconductor-based switching elements, the electronic interruption unit is switched, by means of the semiconductor-based switching elements, to a high-impedance state of the semiconductor-based switching elements to avoid a current flow or a low-impedance state of the semiconductor-based switching elements for the current flow in the electrical low-voltage circuit; and a mechanical isolating contact unit having contacts and connected in series with the electronic interruption unit, wherein the mechanical isolating contact unit is assigned to the at least one load-side connection and the electronic interruption unit is assigned to the at least one network-side connection, wherein the mechanical isolating contact unit is switched by opening the contacts in order to avoid the current flow or closing the contacts for the current flow in the electrical low-voltage circuit;

which method comprises the steps of:

determining a level of a current in the electrical low-voltage circuit;

initiating an avoidance of the current flow in the electrical low-voltage circuit when at least one of current limit values or current-time limit values are exceeded; and during functional testing of the circuit breaker when the contacts of the mechanical isolating contact unit are closed and the electronic interruption unit has been switched to the low-impedance state, the electronic interruption unit is switched to the high-impedance state for a first period of time.

15. The method according to claim 14, wherein when the electronic interruption unit is switched to the high-impedance state for the first period of time, and the level of the voltage across the electronic interruption unit is determined, and, when a first voltage threshold value is fallen below, there is a first fault condition that at least one of initiates the electronic interruption unit changing to the high-impedance state again or initiates opening of the contacts.

16. The method according to claim 14, which further comprises switching the electronic interruption unit to the high-impedance state when an instantaneous value of a voltage between a network-side neutral conductor connection and a network-side phase conductor connection exceeds a second voltage threshold value.

17. The method according to claim 14, wherein when the contacts of the mechanical isolating contact unit are closed and the electronic interruption unit has been switched to the low-impedance state, a level of the voltage across the electronic interruption unit is determined, and when a third voltage threshold value is exceeded, there is a second fault condition that at least one of initiates the electronic interruption unit to change to the high-impedance state again or initiates opening of the contacts.

18. A non-transitory computer program comprising computer executable instructions, which, when executed by a microcontroller, cause the microcontroller to carry out the method according to claim 14.

19. A non-transitory computer-readable storage medium having computer-executable instructions for performing the method according to claim 14.

* * * * *